March 13, 1956  J. SNELL  2,737,716
POWER-DRIVEN TREE HACK AND PULLER
Filed Aug. 25, 1954  2 Sheets-Sheet 2
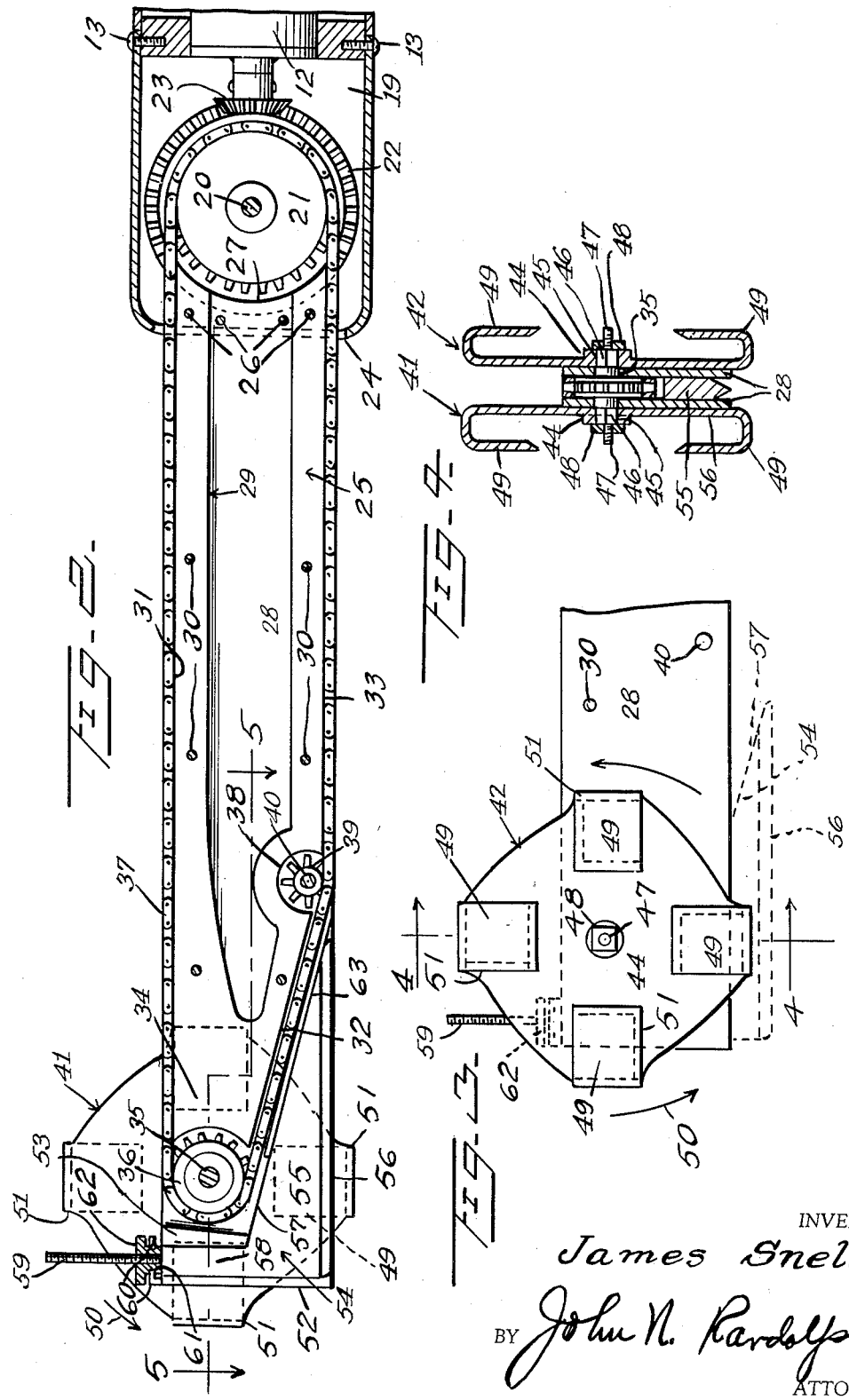
INVENTOR
James Snell
BY John N. Randolph
ATTORNEY

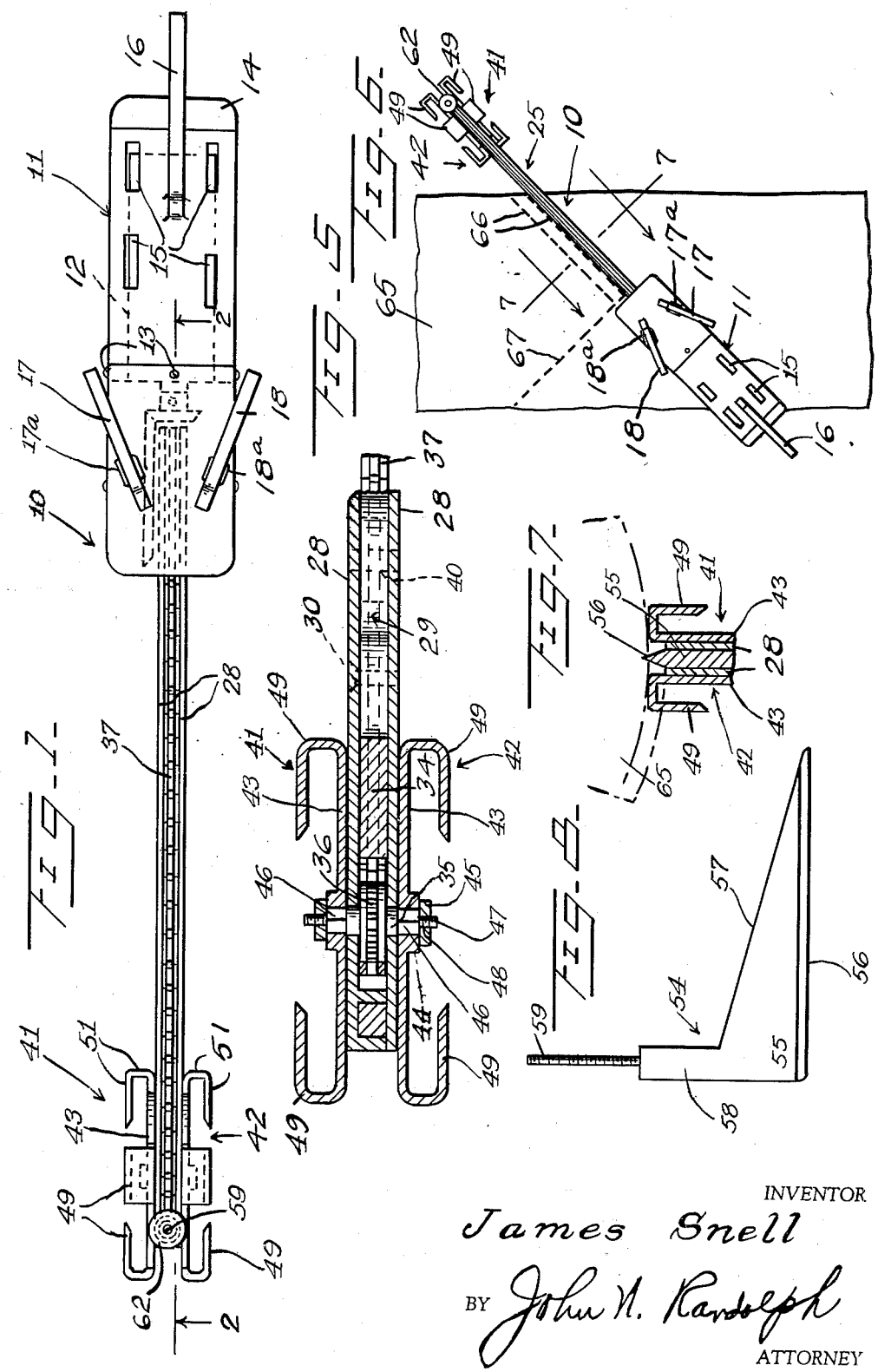

2,737,716

POWER-DRIVEN TREE HACK AND PULLER

James Snell, Waycross, Ga.

Application August 25, 1954, Serial No. 452,119

5 Claims. (Cl. 30—121)

This invention relates to a novel hack and puller for scarifying or gouging the trunks of trees in order to cause the trees to exude sap which can then be collected in suitable receptacles in a conventional manner, as in obtaining turpentine and rubber from pine and rubber trees, respectively.

More particularly, it is an aim of the present invention to provide a tool of simple construction which is readily capable of being manually supported and which can be easily operated for accurately scarring or chipping the trunk of a tree.

Another object of the invention is to provide a tool which is so constructed that it can be readily supported on either side of the body of the operator for properly and conveniently positioning the power tool for scarring both the left and right hand sides of a tree trunk as considered with respect to the portion of the tree trunk faced by the operator.

Still another object of the invention is to provide a power-driven cutting tool of the aforedescribed character having unique means for regulating the depth of the cut made by the tool to prevent injury to the tree and yet to insure a cut of sufficient depth to obtain a proper sap flow.

Still another object of the invention is to povide a tool having depth gauging means additionally functioning as a guide means to cause the tool to move in a straight line while executing its cutting stroke.

Still another object of the invention is to provide a tool which may be constructed in different lengths without appreciably increasing the weight thereof, whereby a tool of short length can be efficiently used as a hack in scarifying a tree trunk near the base thereof, and a longer tool as a puller for accomplishing the same operation at a higher level on the tree trunk.

Various other objects and advantages of the invention will hereinafter become more fully apparent from the following description of the drawings, illustrating a presently preferred embodiment thereof, and wherein:

Figure 1 is a top plan view of the power tool;

Figure 2 is an enlarged fragmentary longitudinal sectional view thereof, taken substantially along a plane as indicated by the line 2—2 of Figure 1;

Figure 3 is an enlarged side elevational view of the forward end of the power tool;

Figure 4 is a cross sectional view thereof, taken substantially along a plane as indicated by the line 4—4 of Figure 3;

Figure 5 is an enlarged longitudinal sectional view through the outer cutting end of the tool;

Figure 6 is a view of the tool in top plan shown positioned to initiate a cutting stroke;

Figure 7 is a fragmentary sectional view through the cutting head of the tool during the cutting stroke thereof taken substantially along a plane as indicated by the line 7—7 of Figure 6 relative to a tree being gouged, and Figure 8 is a side elevational view of the depth gauge and tool guide, removed from the power tool.

Referring more specifically to the drawings, the power-driven tool constituting either a hack or puller in its entirety is designated generally 10 and has a rear end portion formed by an elongated housing 11 in which a motor 12 is contained and secured, as by means of fastenings 13. The housing 11 is provided with a removable rear end portion 14 through which the motor 12 may be applied to or removed from said housing. Additionally, the housing is provided with a plurality of vent openings 15 through which air may pass into and out of the housing for cooling the motor 12. The motor 12 preferably constitutes an electric motor which may be driven from any suitable source of electric current, not shown, to which the motor can be connected by a wiring, not shown, leading from the motor and housing. The housing is provided with a longitudinally and centrally disposed rear handle 16 and angularly disposed right and left front handles 17 and 18 which are offset laterally one to each side of the rear handle 16 and which are disposed substantially forwardly thereof. The front handles 17 and 18 are also inclined outwardly and rearwardly from their forward ends and said front handles and the rear handle are each secured at its forward end to the housing 11. The front handles 17 and 18 on the undersides thereof and adjacent their forward ends are provided with control switches 17a and 18a, respectively, for controlling operation of the motor 12 and which are so arranged that a grasping action of either front handle and the switch which is movably supported therebeneath will energize and cause operation of the motor 12.

The housing 11 has a forward portion defining a chamber 19, as seen in Figure 2, which is disposed forwardly of the motor 12. A shaft 20 extends transversely and horizontally through the chamber 19 and is suitably supported by and fixed to side wall portions of the housing 11. A relatively large sprocket wheel 21 is fixed to the center portion of the shaft 20 and a beveled gear 22, of larger diameter than the sprocket wheel 21, is fixed to the shaft 20 on one side of the sprocket wheel 21 and meshes with a beveled pinion 23 which is fixed to the drive shaft, not shown, of the motor 12, which extends from said motor into the chamber 19. The front wall of the housing 11 and chamber 19 is provided with an elongated opening 24 which aligns with the sprocket wheel 21 and which is of a length greater than the diameter of said sprocket wheel.

An elongated guide and support, designated generally 25 has an inner end which extends into the chamber 19 through the opening 24 and which is secured to the housing 11 rigidly by fastenings 26. Said inner end 27 of the guide and support 25 is concavely bowed to substantially conform to the curvature of a portion of the sprocket wheel 21 and is spaced from the periphery of said sprocket wheel and disposed between a portion of the sprocket wheel periphery and the opening 24. The support and guide 25 comprises spaced substantially parallel side walls 28 and a spacing member, designated generally 29, which is interposed between the walls 28. Fastenings 30 extend through the walls 28 and spacing member 29 for securing said parts together and for locating the spacing member in a desired position relatively to the top and bottom edges of the walls 28. The spacing member 29 has an upper edge located beneath the upper edges of the walls 28 forming a top supporting rail 31 and bottom edge portions 32 and 33, located above the bottom edges of the walls 28, forming bottom rail portions 32 and 33. The spacing member 29 has a restricted outer end 34 formed by the upwardly and outwardly inclined bottom rail portions 32. Said forward end 34 terminates rearwardly of the forward ends of the walls 28.

A shaft 35 has an intermediate portion extending through and journalled in the walls 28, forwardly of the spacing member part 34. A sprocket wheel 36 of smaller diameter than the sprocket wheel 21 is fixed to the shaft 35 and is turnably mounted between the walls 28 and forwardly of the part 34. An endless chain 37 is trained over the sprocket wheels 21 and 36. The upper flight of the chain 37 rides the top rail 31 between the upper portions of the walls 28 and the bottom flight of the chain rides the bottom rail portions 32 and 33 between lower portions of the walls 28. The spacing member 29 has a recessed downwardly opening bottom part 38 which opens outwardly thereof between the rail portions 32 and 33 and in which an idler sprocket wheel 39 is rotatably disposed between the walls 28. The sprocket wheel 39 is journalled on a shaft 40 the ends of which are mounted in the walls 28. A portion of the sprocket wheel protrudes below the bottom rail portions 32 and 33 and is engaged by a part of the bottom flight of the chain 37 to support the chain as it passes from the inclined rail portion 32 into engagement with the straight rail portion 33. The top and bottom flights of the chain pass through the housing opening 24 in which portions of the side walls 28 are disposed.

Corresponding cutting heads 41 and 42 are rotatably mounted on opposite sides of the forward end of the support 25, on the outer sides of the forward portions of the walls 28. Each of the cutter heads 41 includes a substantially flat disk-like portion 43 having an externally thickened central portion 44 in which is formed a centrally disposed noncircular opening 45. The shaft 35 has noncircular portions 46 projecting outwardly from the walls 28 which snugly and nonturnably fit the openings 45 whereby the cutter heads 41 and 42 are keyed to the shaft 35. Said shaft 35 has restricted threaded stems 47 constituting the terminals thereof which are engaged by nuts 48 which abut against the outer ends of the enlargements 44 for retaining the cutters 41 and 42 in engagement with the shaft portions 46.

The cutter heads 41 and 42 are provided with circumferentially spaced outwardly turned back hook-like portions 49 which constitute integral parts of the disk portions 43. Said parts 49 constitute cutting blades. The bevelled gear 22 is driven counterclockwise as seen in Figure 2 for driving the sprocket wheels 21 and 36 in the same direction and so that the cutter heads 41 and 42 are driven counterclockwise as seen in Figures 2 and 3 and as indicated by the arrows 50. The leading edges of the blades 49 are beveled on their inner sides to provide cutting edges 51, as best seen in Figure 1. The guide and support 25 includes an outer end wall 52 which extends from top to bottom of the outer ends of the walls 28. A partition element 53 is secured in the support 25 between and to the walls 28 and is located between the sprocket wheel 36 and said end wall 52, and extends from the upper edges of the walls 28 downwardly to a point approximately midway of the top and bottom edges of said support 25. A combination depth gauge and tool guide, designated generally 54, includes an elongated blade 55 having a straight beveled bottom edge 56. The blade 55 has an inclined top edge 57 one end of which merges with an end of the bottom edge 56 and the opposite end of which terminates adjacent the other end of the blade 55 and at one side of an integral shank 58. The shank 58 forms an upstanding extension of the wider end of the blade 54 and is sized to slidably and nonturnably fit the space between the end wall 52 and partition 53 and between portions of the side walls 28. Said shank 58 terminates at its upper end in an elongated threaded stem 59. The upper end of the wall 52 and the upper end of the partition element 53, above the side walls 28, are provided with inturned lip members 60 which are disposed in opposed spaced apart relation to one another and which turnably engage an annular groove 61 of a nut 62, through which the stem 59 threadedly extends. Accordingly, it will be readily apparent that the nut 62 may be rotated in one direction for drawing the stem 59 upwardly therethrough to thereby draw the gauge blade 55 and shank 58 upwardly to their fully raised positions as seen in Figure 2 and wherein the bottom edge 56 of the blade 55 is disposed between and substantially coplanar with the bottom edges of the walls 28, as seen in Figures 2 and 4. If desired, a stop strip 63 may be secured between portions of the walls 28 beneath, spaced from and substantially parallel to the rail portion 32 to provide clearance between said stop member 63 and the rail portion 32 for free movement of the bottom flight of the chain 37. The member 63 provides an abutment or stop to engage the upper inclined blade edge 57 in a fully retracted position of the guide and gauge 54. By turning the nut 62 in the opposite direction, the gauge 54 will be displaced downward relatively to the support 25 to position the blade edge 56 below the bottom edges of the walls 28, as illustrated in dotted lines in Figure 3.

The tool 10 as illustrated in Figure 6 is disposed in a position preparatory to gouging or scarifying the right-hand side of a tree trunk 65. The tool 10 is supported in this position by the operator grasping the rear handle 16 in his left hand and the right front handle 17 with his right hand and at the same time applying a gripping pressure to the switch 17a with the right hand for energizing the motor 12 to drive the cutter heads 41 and 42 in a counterclockwise direction as seen in Figures 2 and 3. With the tool thus held, it is moved downwardly and to the left in a direction parallel to its axis so that the cutting edges 51 of the left-hand cutter 42 will execute a cutting action from right to left and downwardly at an incline for removing a part of the tree trunk, disposed between the parallel rows of dotted lines 66 as seen in Figure 6. The gauge and guide 54 will have been previously adjusted so that the blade edge 56 will ride a portion of the tree trunk disposed beneath the portion being gouged out between the dotted lines 66 to limit the depth of the cut made by the blades 49 of the cutter head 42. Likewise, said beveled edge 56 will penetrate the previously gouged part of the tree trunk to a slight depth, as illustrated in Figure 7, to guide the cutting head 42 during its cutting stroke so that said head can be more readily moved in a straight line parallel to the dotted lines 66. Thus, the cutting stroke will be accomplished not only in a straight line but to a proper depth so that a proper flow of sap will be obtained from the tree trunk 65 yet not to a sufficient depth to injure the tree. It will be readily apparent that the tool can be inclined in the opposite direction parallel to the broken line 67 of the tree trunk 65 when a similar gouging or scarifying cutting stroke is made on the other, left-hand side of the tree trunk. In making a cut on the left-hand side of the tree trunk, the handle 16 is grasped with the right hand and the left front handle 18 is grasped with the left hand and the switch 18a is utilized in lieu of the switch 17a. Additionally, the blades 49 of the right-hand cutter head 41 will execute a cutting stroke on the left-hand side of the tree trunk parallel to the broken line 67.

The length of the tool 10, between the housing 11 and cutting heads 41 and 42, may be varied by utilizing supports and guides 25 of different lengths. A short support and guide is utilized for scarifying a tree trunk near the base thereof, known as "hacking," and a longer support and guide is utilized where the tree trunk is scarred at a higher elevation, known as "pulling."

Various modifications and changes are contemplated and may obviously be resorted to, without departing from the spirit or scope of the invention as hereinafter defined by the appended claims.

I claim as my invention:

1. A portable power-driven tree gouging tool comprising an elongated supporting frame having a forward end and a rear end, driving means supported by the frame adjacent its rear end, a rotary type cutter head rotatably mounted on the forward end of said frame, and means carried by the frame and forming a driving connection between said driving means and cutter head, the axis of rotation of said cutter head being disposed transverse to the longitudinal axis of said frame, said cutter head being disposed on one side of said frame and being provided with a plurality of circumferentially spaced cutting blades each having cutting edges disposed at an angle to one another and which are outwardly disposed relative to the plane of the cutter head.

2. A power tool as in claim 1, and a combination depth gauge and guide mounted in said forward frame end longitudinally thereof and manually adjustable relatively to the frame and to said cutter head in a direction radially of the cutter head, said gauge and guide having a substantially straight tree trunk engaging edge disposed parallel to the longitudinal axis of the frame for engaging the tree trunk to one side of the cutter head for regulating the cutting depth of said blades and for guiding the forward end of the tool and the cutter head in the movement of said parts relative to a tree trunk.

3. A portable power-driven tree trunk scarring tool comprising an elongated frame having a forward end and a rear end, a shaft journalled in the forward end of said frame and transversely thereof, a cutter head keyed to said shaft and supported thereby on one side of the frame, driving means supported by the opposite end of said frame, and means supported by said frame for movement relatively thereto and forming a driving connection between said driving means and shaft for revolving the cutter head relatively to the frame, said cutter head having circumferentially spaced cutting blades each having a first cutting edge extending outwardly from the plane of the cutter head and a second edge disposed at an angle to the first cutting edge and outwardly offset relative to the cutter head.

4. A tool as in claim 3, manually engageable front and rear handles secured to the last mentioned end of said frame in longitudinally spaced relation to one another including a front handle laterally offset from the axis of the frame in a direction opposite to the offset disposition of said cutter head.

5. A tool as in claim 3, a manually adjustable depth gauge and guide mounted in the forward end of said frame and extending longitudinally thereof, said gauge and guide being adjustable in a direction parallel to the plane of said cutter head and movable toward and away from a longitudinal edge of the frame.

References Cited in the file of this patent

UNITED STATES PATENTS

| | | |
|---|---|---|
| 214,072 | Whittemore | Apr. 8, 1879 |
| 2,028,784 | Jennett | Jan. 28, 1936 |
| 2,042,097 | Havanas | May 26, 1936 |
| 2,186,654 | Perry | Jan. 9, 1940 |
| 2,471,235 | Nick | May 24, 1949 |
| 2,592,900 | Hough | Apr. 15, 1952 |